…

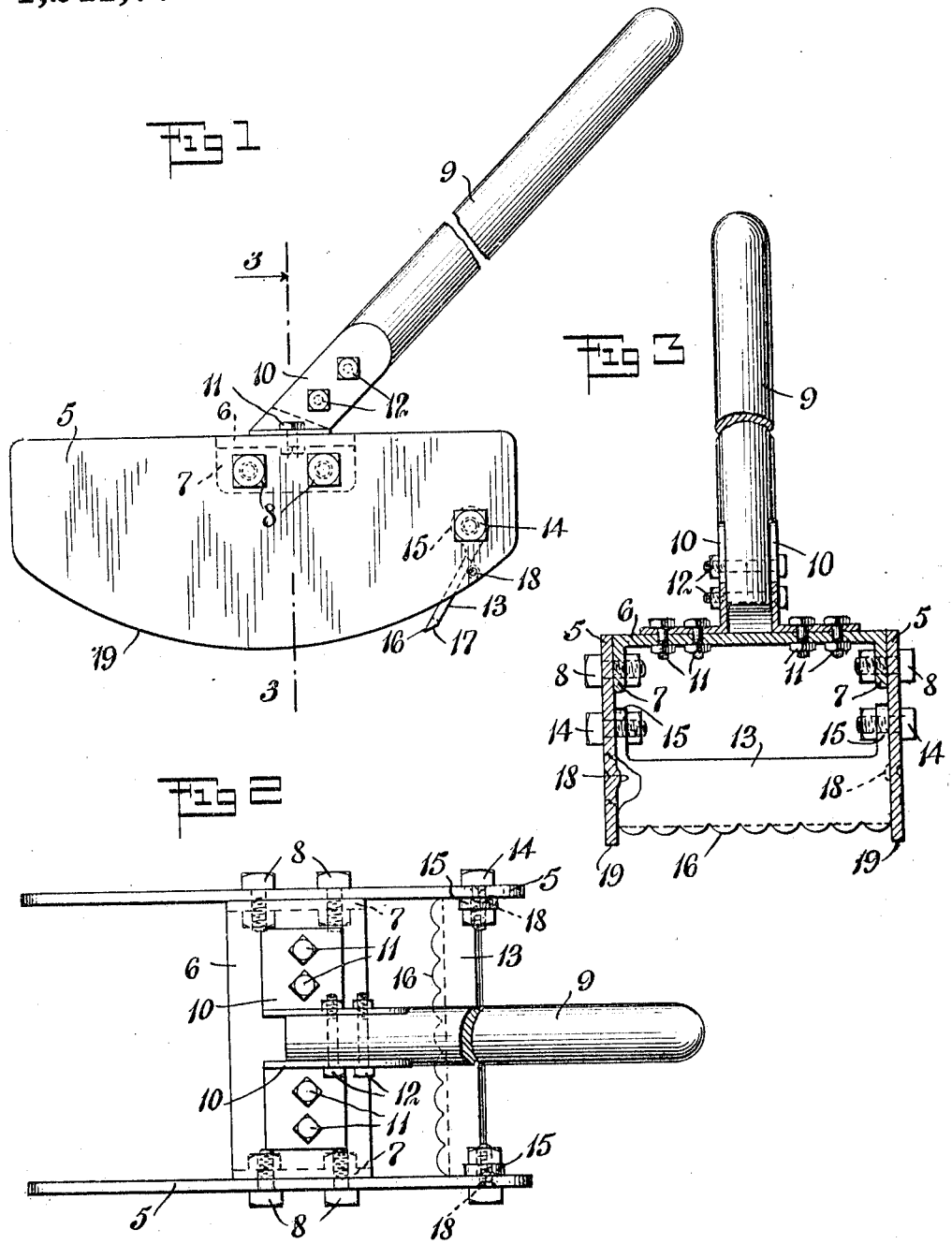

UNITED STATES PATENT OFFICE.

CORNELIUS SUYDAM, OF BROOKLYN, NEW YORK.

SNOW AND ICE REMOVER.

1,241,779.      Specification of Letters Patent.      Patented Oct. 2, 1917.

Application filed September 26, 1916. Serial No. 122,191.

*To all whom it may concern:*

Be it known that I, CORNELIUS SUYDAM, a citizen of the United States of America, residing at Gravesend, Brooklyn, N. Y., have invented a new and useful Snow and Ice Remover, of which the following is a specification.

My invention relates to devices for removing snow, ice or sleet from pavements, walks, etc., particularly ice and snow that has become packed and hardened to such an extent that it cannot be removed in the usual way.

The principal objects of the invention are to provide a simple and inexpensive device for this purpose which can be easily operated to quickly remove ice, sleet, etc., and more especially which can be adjusted in the course of operation to meet different requirements as to hardness and depth of ice, etc.

Other objects are to provide a device of the character described which can be collapsed or taken down as for shipping or storing purposes, which will be durable and which will be altogether practical and efficient.

In the accomplishment of the foregoing I construct the device with a pair of side runners having rounded bearing edges in the nature of rockers, support a cutter blade between said runners and provide handle mechanism by which the device may be operated. The runners or rockers are preferably connected by a cross bar which may be disconnected from the runners when desired and the cutter is also mounted so that it may be disconnected from the runners when the device is to be taken apart.

Other features and details of construction will appear as the specification proceeds, attention being directed to the accompanying drawing forming a part hereof and wherein I have illustrated the invention embodied in a practical and preferred form.

Figure 1 is a side elevation of a device constructed in accordance with and embodying the features of this invention.

Fig. 2, is a top plan view of the same.

Fig. 3, is a vertical sectional view taken substantially on the plane of the line 3—3 of Fig. 1.

Referring to the drawing now more in detail—

5 designates the runners or sides of the device secured together in spaced parallel relation by cross bar 6 having in the illustration downturned angular ends 7 abutted against the sides of the runners and secured thereto by fastenings such as the bolts 8.

This cross bar is usually located about mid-way between the ends of the runners and preferably carries a socket to receive the operating handle 9. This socket is provided in the illustration by a pair of upstanding angle plates 10 detachably secured on top of the cross bar by bolts 11 and between the upstanding sides of which the handle is secured by means such as the bolts 12. The handle is preferably mounted on a rearward incline at an angle convenient for pushing and handling the device.

The cutter blade is designated 13 and the same is shown held in place between the runners by the fastening bolts 14 passed through the lugs 15 on the ends of the cutter bar. This cutter bar is set on a forward incline as indicated in Fig. 1 and is provided at its lower end with a cutting edge 16 preferably toothed or corrugated as indicated in Figs. 2 and 3. This cutting edge is preferably formed by beveling the rearward portion of the lower end of the cutter blade on a forward incline as indicated at 17 so that upon each rearward stroke of the device the cutter blade will be sharpened more or less by its engagement with the surface over which the device is being operated. The securing bolts 14 when loosened enable the cutter blade being set to different angles and to prevent the blade from working loose and dropping down at a steep angle, stop lugs 18 may be provided on the runners to form back rests for the blade.

The operation of the device is facilitated and the device is made adjustable for cutting heavier or lighter by providing the runners 5 with rounded bearing edges 19, thus forming said runners into rockers which can be rocked on the supporting surfaces to raise or lower the cutter blade.

In using the device the cutter is simply pushed along over the hardened snow or icy surface, the sharpened toothed blade in this movement cutting up the material and breaking it loose from the pavement. To remove a light crust, no extra weight need be put on the cutter blade, but for a heavier crust or for lumpy material more weight may be necessary, whereupon the handle will be lowered to thereby rock the cutter blade downward and put all or a greater portion of the weight directly on the cutter blade, causing the blade to cut through the heavier obstructions. This rocker construction also is desirable in that it enables the making of graded cuts, that is, one layer at a time. The rockers furthermore, provide a sliding and a substantially frictionless support for the cutter blade. Another advantage of the construction disclosed is that a free space is provided above the cutter so that the cuttings can pass up freely over the upper edge of the blade without clogging the device in any way. When it is desired to ship or store the device the parts may be packed away in compact relation by simply removing the bolts and laying the parts flat together. The device can be made very inexpensively, and to reduce the expense as much as possible I propose to construct it, with the exception of the cutter blade, handle and securing bolts, entirely of sheet metal heavy enough to withstand the usage and provide the necessary weight and stamped to shape in suitable presses. When so made, the back rest 18 for the cutter blade may be formed by simply punching in indentations in the sides of the runners. The location of the cutter blade at the rear ends of the runners, as shown, enables a relatively slight lifting or lowering movement of the handle to effect the necessary raising or lowering of the cutter blade.

What I claim is:—

1. A snow and ice remover, comprising a pair of runners, having bearing edges curved in the direction of length of the runners, a scraper blade rigidly secured at its ends to said runners and holding the same in spaced apart relation, said scraper blade having a cutting edge projecting below the plane of the curved bearing edges of the runners and a rearwardly and upwardly inclined push handle secured to the runners for pushing the device along over an icy surface and for simultaneously rocking the runners on their curved bearing edges to thereby lift or lower the cutting edge with respect to the supporting surface.

2. A snow and ice remover comprising runners having rounded bearing edges, a forwardly inclined cutting blade secured between the runners at the rearward portions of the runners and projecting below the plane of the rounded bearing edges of the runners and a push handle connected with the runners at a point forward of the cutting blade whereby to enable said device being pushed forwardly over the supporting surface and to permit of the runners being rocked on their rounded bearing edges to thereby raise and lower the projecting cutting edge of the scraper blade with respect to the supporting surface which the rounded bearing edges engage.

3. A snow and ice remover comprising a pair of runners having rounded rocker edges, a cross bar connecting said runners in spaced relation and provided with a socket for a handle, a handle engaged in said socket and a forwardly inclined cutting blade secured between the runners and provided with a corrugated cutting edge and beveled on the rear side thereof, whereby to be sharpened by engagement with the supporting surfaces upon the rearward strokes of the device.

CORNELIUS SUYDAM.

Copies of this patent may be obtained for five cents each, by addressing the "Commissioner of Patents, Washington, D. C."